United States Patent [19]
Zuck

[11] 3,730,459
[45] May 1, 1973

[54] AIRPLANE WITH FLOATING WING AND REVERSE PROPELLER THRUST

[76] Inventor: Daniel R. Zuck, 14273 Beaver St., San Fernando, Calif. 91340

[22] Filed: Sept. 18, 1969

[21] Appl. No.: 860,170

Related U.S. Application Data

[63] Substitute for Ser. No. 659,278, July 20, 1967, abandoned.

[52] U.S. Cl. .................................................. 244/48
[51] Int. Cl. .................................................. B64c 3/42
[58] Field of Search ....................... 244/48, 7, 13, 53, 244/55, 65, 82, 113

[56] References Cited

UNITED STATES PATENTS

| | | | |
|---|---|---|---|
| 1,631,187 | 6/1927 | Bambini | 244/113 |
| 1,824,325 | 9/1931 | Brequet | 244/55 |
| 2,347,230 | 4/1944 | Zuck | 244/82 |
| 2,532,755 | 12/1950 | Bloomfield | 244/65 |
| 2,548,787 | 4/1951 | Heberding | 244/82 |
| 2,604,276 | 7/1952 | Huben | 244/55 X |
| 2,684,214 | 7/1954 | Perry | 244/48 |
| 2,689,695 | 9/1954 | Perry | 244/48 |
| 3,166,271 | 1/1965 | Zuck | 244/48 X |

FOREIGN PATENTS OR APPLICATIONS

| | | | |
|---|---|---|---|
| 1,003,886 | 2/1952 | France | 244/48 |

*Primary Examiner*—Milton Buchler
*Assistant Examiner*—Carl A. Rutledge

[57] ABSTRACT

This invention relates to aircraft, to the improvement in floating wing aircraft, to the improvement in the stability of floating wing aircraft at very low and negative lift angles of attack, to the improvement in aircraft having floating wings with non-stalling characteristics, and to aircraft with non-stalling characteristics employing the engine power to create a large variable aerodynamic drag force to vary and to precisely control the angle of descent of the aircraft and during landing of the aircraft.

15 Claims, 19 Drawing Figures

INVENTOR.
BY Daniel R. Zuck

INVENTOR
Daniel R. Zuck

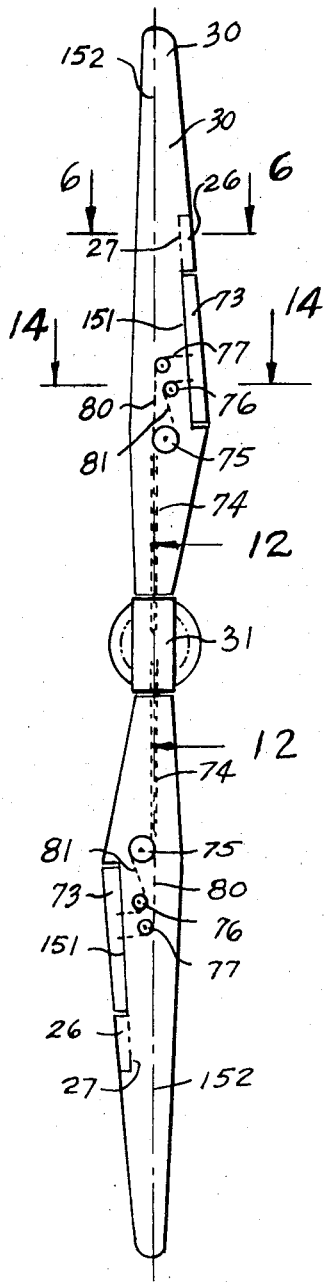
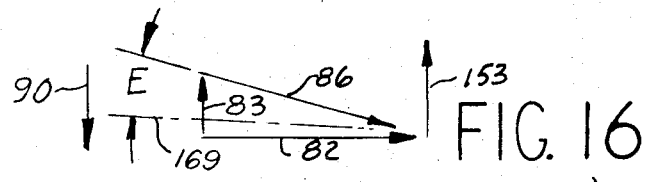
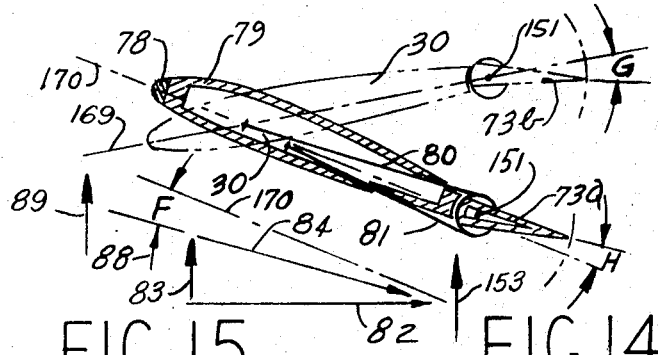
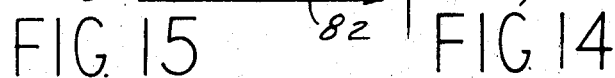
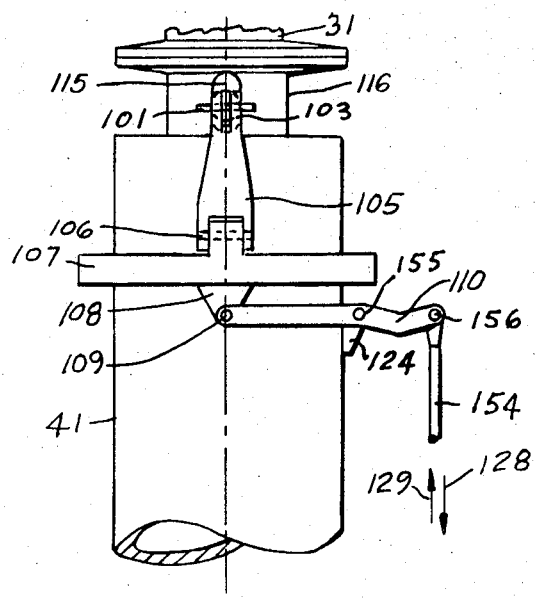
FIG. 11
FIG. 16
FIG. 15   FIG. 14
FIG. 13
INVENTOR.
BY Daniel R. Zuck

AIRPLANE WITH FLOATING WING AND REVERSE PROPELLER THRUST

This application is a substitute for my previous application Ser. No. 659,278, filed July 20, 1967, now abandoned.

I, the applicant, Daniel R. Zuck, am also the inventor of the Zuck, U.S. Pat. No. 2,347,230. Similar to the applicant's airplane, the Zuck Patent teaches a floating wing with pilot-controlled surfaces on the trailing edges of the wings to which the said wing on a horizontal hinge axis responds to aerodynamic forces to adjust the wing's angle of attack in accordance with the pilot's pre-positioning of the said pilot-controlled surfaces.

Unlike the applicant's disclosure the Zuck Patent teaches a limited range of angle of attack of plus 4° and upwards which is described in the Zuck U.S. Pat. No. 2,347,230, page 6, first column, lines 35 through 53, and ending with "4°" in line 54. Note the restriction to exclusive upward travel of the control-surface 6 in th Zuck Patent, illustrated also in Zuck's in FIG. 4.

This restriction of 4° angle of attack in the Zuck Patent is positively required because of inherent aerodynamic defficiencies. This is conclusively evident in the applicant's drawings in FIG. 8 where the center of aerodynamic pressure (C.P.) at 145 takes a catastrophic plunge from 25 per cent ofthe wing chord at 4° angle of attack to 45 per cent or more of the wing chord at minus 2° angle of attack. The Zuck Patent deliberately, by design of the structure avoids this unstable range of the angle of attack. This, thereby, seriously limits the control of the Zuck patented airplane and critically restricts the airplane's utility in the hands of the novice.

In FIG. 8 of the applicant's drawings a gross weight of plus 1,400 lbs is shown on the line 134. This same point is above in FIG. 10 on line 133 at 140 miles per hour (M.P.H.). In FIG. 8 of the applicant's drawings it is therefore obvious that the airplane taught in the Zuck U.S. Pat. No. 2,347,230 can not descend at cruise speed of 140 M.P.H.

The applicant's drawings FIGS. 1, 4, 5, 6 and 7 teach that at 140 M.P.H. in FIG. 10 on the line 133, when the applicant's wing 25 is lifting 1,400 lbs, the angle of attack of 2° in FIG. 8 of the applicant's drawings may lift 1,400 lbs. on the ($C_L$) line 134 which lift can be reduced to a negative lift of minus 280 lbs at an angle of attack of minus 2° allowing the airplane to descend.

The above said improvements which are integrated with the freely floating and non-stalling characteristics of the wing are further improved in utility and control in the hands of novice flyers when reverse propeller thrust is added to the aircraft. This is illustrated in FIG. 17, where for example the airplane in flight at 80 M.P.H. an hour will have a gliding angle of descent with the engine-power off of about 8°. With the engine power providing reverse thrust this descent angle may be dramatically increased to 32° with no change in miles per hour (M.P.H.) flight speed as seen in FIG. 17.

The applicant's invention therefore greatly increases the range of control of the floating wing. It provides a great improvement in safety, in ease and precise control of aircraft in the hands of the pilot novices.

This invention relates to aircraft, the improvement in flying, improvement in diving and gliding control characteristics using reverse propeller thrust in flight, particularily improvement of the floating wing aircraft as taught in my prior patents, U.S. Pat. Nos. 2,347,230; 2,959,373 and 3,056,564.

The primary object of this invention is to achieve negative lift control of the wing, to improve the aerodynamic trim, the wing stability, the wing control characteristics, the dive stability and the pilot's control of an airplane employing my freely floating wing described in my U.S. Pat. No. 2,347,230, FIGS. 4 and 6.

Another object is to provide means to more precisely control the angle and speed of the descent of an airplane with the above described freely floating wing using the powerplant and propeller in reverse thrust at the direction and control of the pilot.

Another object is to attain the primary and secondary objects above while retaining the unstallable characteristics and full controllability of the aircraft so that a novice can exercise precise control into restricted landing areas with absolute safety, simple skill and control.

My invention, U.S. Pat. No. 2,347,230, of the freely floating wing shown in FIGS. 4 and 6 of said invention has proven to be non-stallable and very safe for the novice at low speed, but at cruising speed and at higher speeds a difficulty developed which didnot permit an angle of attack less than about 2° to be attained because of a lack in stability of the airfoil when mounted on its described pivot, line $x$—$x$, FIG. 5. LN, arrow 53 in FIG. 4 of said patent could not be reduced to zero because of the prevailing counter-clockwise force LR. Negative lift of the wing, could not be achieved with the balance of forces that were taught.

As noted in U.S. Pat. No. 2,347,230, FIG. 4, and as described in the said patent, page 6, first column, fourth paragraph, lines 35 through 54 the object of said patent was to maintain at all times through a mechanical linkage an irreducible LN force and thereby provide a bulit-in aerodynamic force to prevent excessive dives. This proved impractical at low angles of attack and high speed. It did not permit a downward flight descent control of the aircraft at high speed and therefore limited the controllability of the aircraft at high speed. A zero lift or negative lift of the floating wing could not be attained. At high speed the aircraft could not descend, or be flown downward toward the ground.

Another object of this invention is to have an equivalent built-in aerodynamic clockwise LN trim force for stability in counteracting the counter clockwise force LR of the U.S. Pat. No. 2,347,230 and to provide an additional aerodynamic pilot controlled surface to reduce the wing to zero lift while retaining aerodynamic stability of the freely floating wing.

Another object is to limit the ratio of the amount of the negative lift which can be produced by a freely floating wing.

Another object is to provide an airplane with a freely floating wing with descent control attained with a reverse propeller thrust controllable by the pilot.

Another object is to provide an airplane with a tail mounted propeller and a freely floating wing with reverse propeller thrust means.

This application is a substitute of my prior patent application for Airplane With Floating Wing and Reverse Propeller Thrust, Ser. No. 659,278, filed July 20, 1967, now abandoned, on which seven claims were allowed. The allowed claims did not cover some of the important features of the invention, making it possible to circumvent the intent of the patent.

How the foregoing objects and advantages are secured together with others, which will occur to those skilled in the art, will be more apparent from the following description making reference to the accompanying drawings, in which FIG. 1 is a plan view of the aircraft showing the general configuration of the wings and propeller embodying my invention;

FIG. 11 is a view of the propeller in enlarged scale taken on the line 11—11 in FIG. 1;

FIG. 13 is a view in reduced scale taken on the line 13—13 in FIG. 12 showing the connection of the pilot's control to the propeller thrust reversing linkage;

FIG. 14 is a section in enlarged scale taken on the line 14—14 in FIG. 11 showing the propeller in positive pusher thrust position and in the phantom position in the reverse thrust position for aerodynamic braking;

FIG. 15 is the schematic airflow and force diagram illustrating the angle of attack in the positive normal pusher thrsut mode;

FIG. 16 is the schematic airflow and force diagram illustrating the angle of attack of the reverse position of the propeller for aerodynamic braking;

Figure 4:
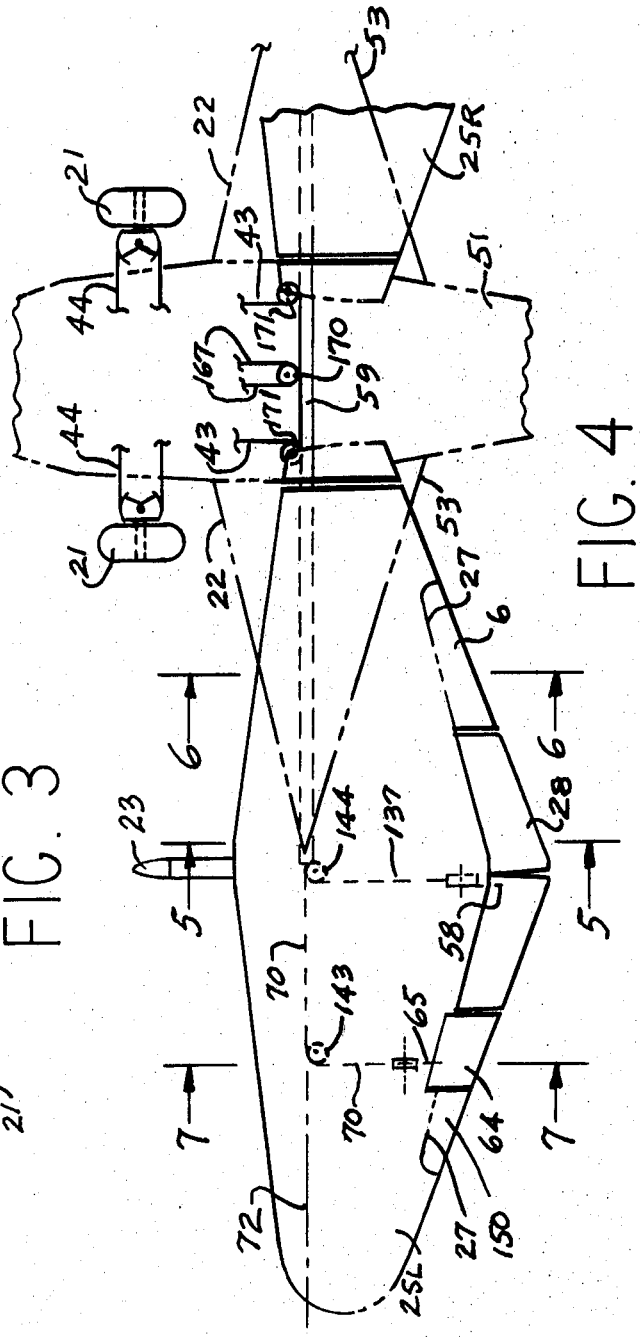
FIG. 4 is a fragmental plan view of the aircraft in the same scale as FIG. 3 showing an alternate arrangement of the floating wing trim schemes.

In my U.S. Pat. No. 2,347,230 as illustrated in FIG. 4 and 4A the force LN counteracts LR, and in turn they are balanced by arrow W, item 67 as further described on page 6, lines 51 through 54 that the angle of attack is limited to 4°.

I have discovered in practice that the wing could not be reduced to zero degrees angle of attack because of its instability at low angles. This is apparent when viewing FIG. 8 of this application where the center of pressure curve 135, the C.P., is shown to be virtually a straight line at approximately 25 percent of the chord between the angles of attack of plus 2° and the angle where the airfoil stalls. From plus 2° to minus 2° the center of pressure makes a rapid sweep aft and the entire wing on the pivot as described in my U.S. Pat. No. 2,347,230 becomes dramatically unstable with a large counter clockwise pitching moment.

For the above reason as taught in my U.S. Pat. No. 2,347,230 it was impractical to permit the wing to aerodynamically float to less than plus 3° angle of attack. The control characteristics of my said wing of U.S. Pat. No. 2,347,230 are shown by the curves in the broken lines A′ and B′, FIG. 9 of this application. In this application the curve A′ shows the angle of the wing 4 of U.S. Pat. No. 2,347,230 VS the wheel 79 position in inches aft and the corresponding ailerator 6 with the wing angle on its pivot 66, in U.S. Pat. No. 2,347,230. Note that the minimum wing angle of attack A′ is +2° with the control wheel 79 at zero inches aft. This very conclusively demonstrates the limitations taught in my U.S. Pat. No. 2,347,230, and these are the limitations this Patent application overcomes.

Figure 10:
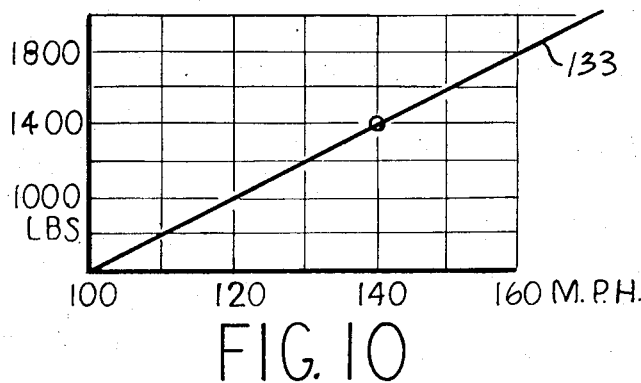
FIG. 10 is a graph showing the lift of the freely floating wing at an angle of attack of 2° at speeds of 100 miles per hour through 160 miles per hour.

The above limitations as taught in my U.S. Pat. No. 2,347,230 are further illustrated in FIG. 10 of this application where on line 133 at a speed of 140 miles per hour the wing generates 1,400 pounds of lift which is the gross weight of a plane I have designed using the floating wing as taught in my U.S. Pat. No. 2,347,230. In referring to FIG. 8 of this application it is noted that 1,400 pounds lift is generated at plus 2° angle of attack. If the ailerator 28 is established to maintain no less than 3° angle of attack it is shown in FIG. 10 that the airplane cannot be flown downward at 140 miles per hour. It will go upward as a matter of fact and no control means is present to cause it to descend except by reducing the forward speed of the craft. This is apparent in FIG. 10 of this application. If 1,400 pounds is the weight of the craft at 140 miles per hour it will fly level. At an increased speed the aircraft will ascend and can not be made to descend. The only way it can be made to descend is to reduce the speed of the craft as is seen in FIG. 10 where at 120 miles per hour the lift is only 1,000 pounds which is 400 pounds less lift than is required to support the plane. Therefore, the plane will descend.

Figure 1:
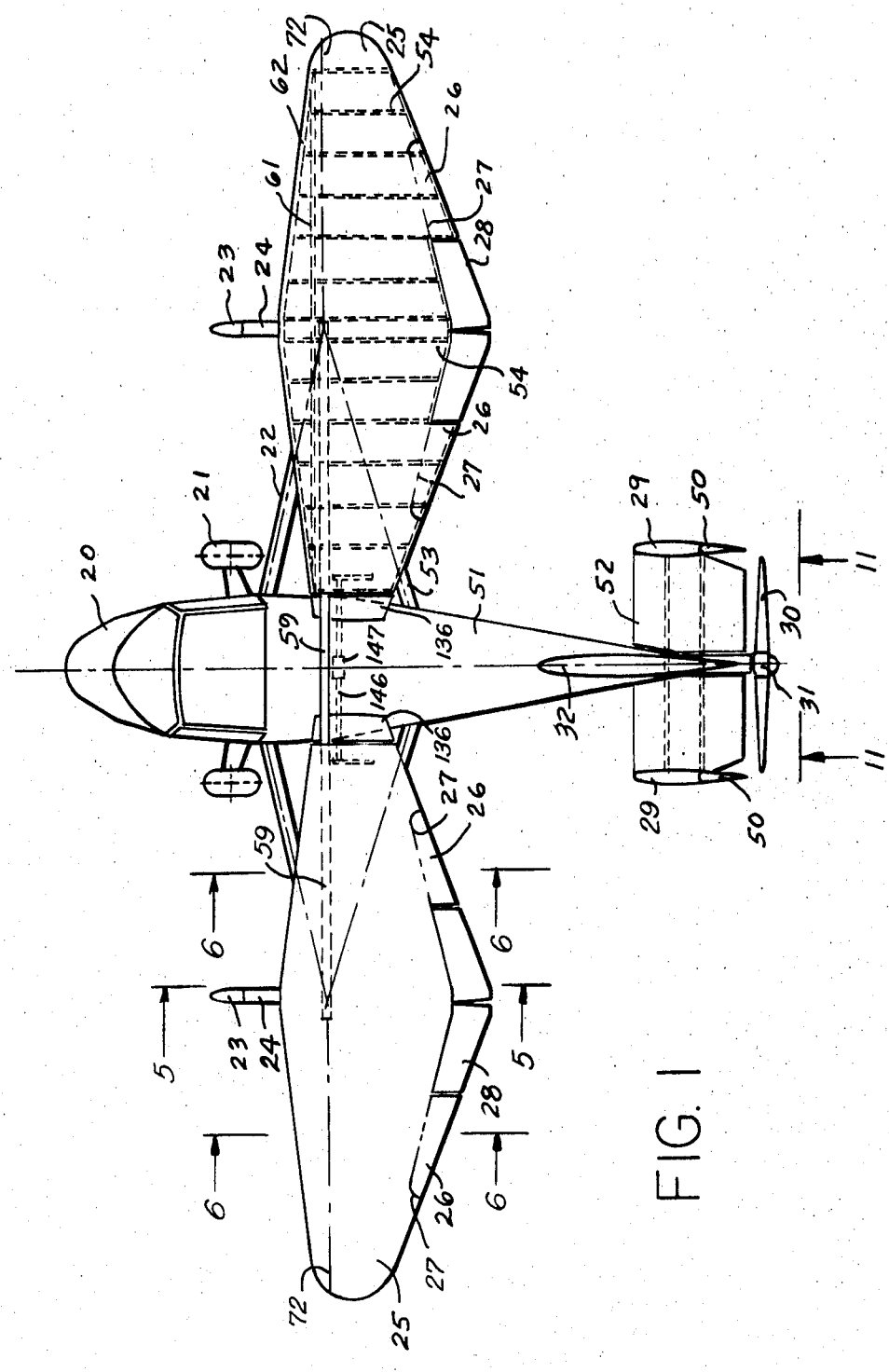

My invention is embodied in FIG. 1 comprising left and right hand wings 25, a fuselage 51, a landing gear 21, an aft horizontal tail 52, a vertical tail 29, and a pusher propeller 30 and 31. These elements are further illustrated in the front view, FIG. 2 and in the side view, FIG. 3.

Figure 2:
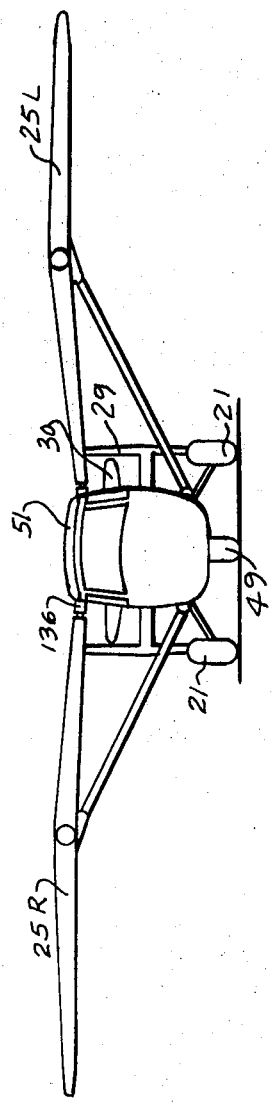
FIG. 2 is a front view of the aircraft shown in smaller scale.
Figure 3:
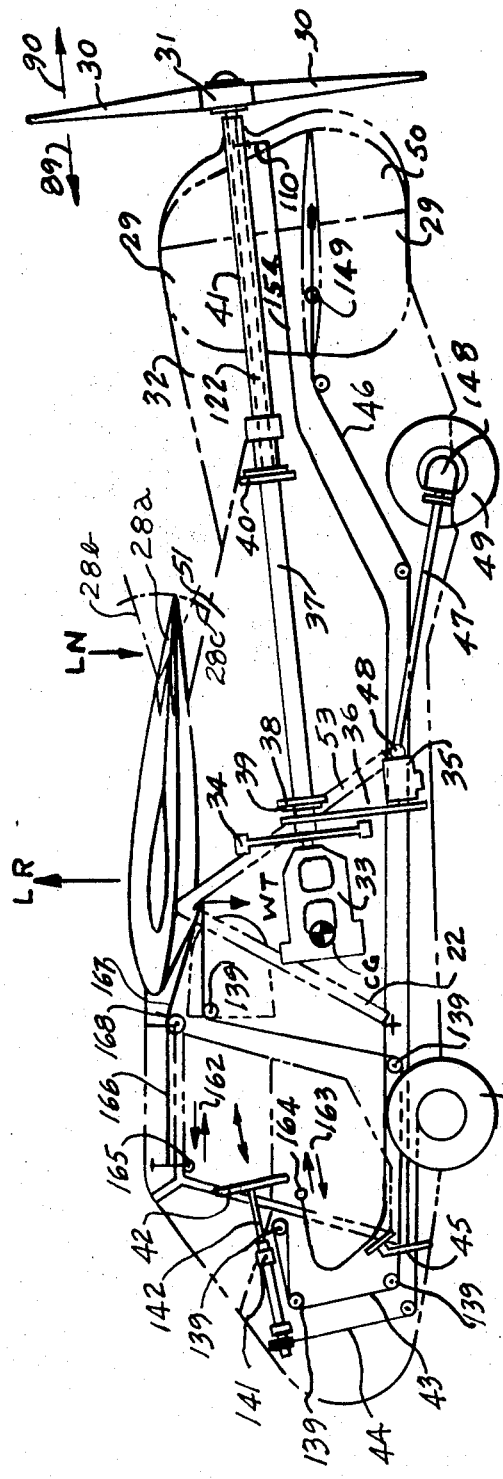
FIG. 3 is a side view in enlarged scale of the aircraft showing the inboard profile of the engine, road drive, propellar drive, and flight controls.
Figure 5:
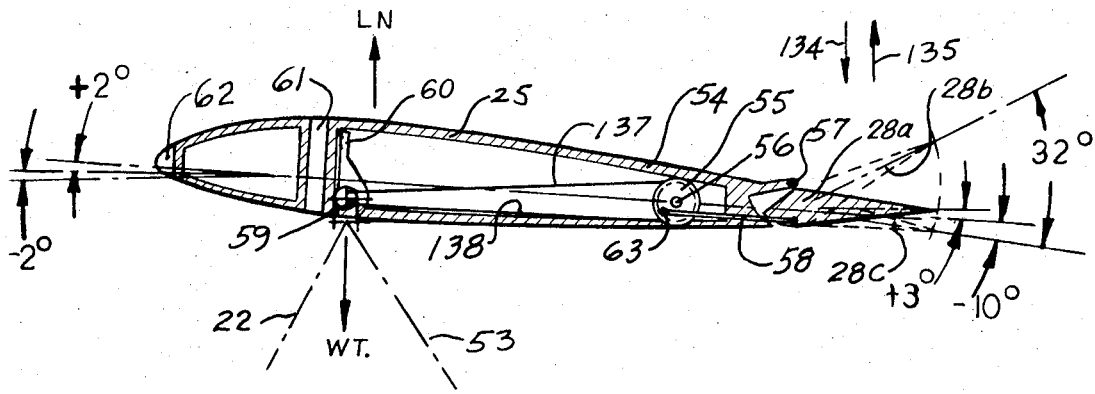
FIG. 5 is a section taken on line 5—5 in FIGS. 1 and 4 showing the structural hinge support of the floating wing and the method of aerodynamically controlling the wing on its hinged axis.
Figure 8:
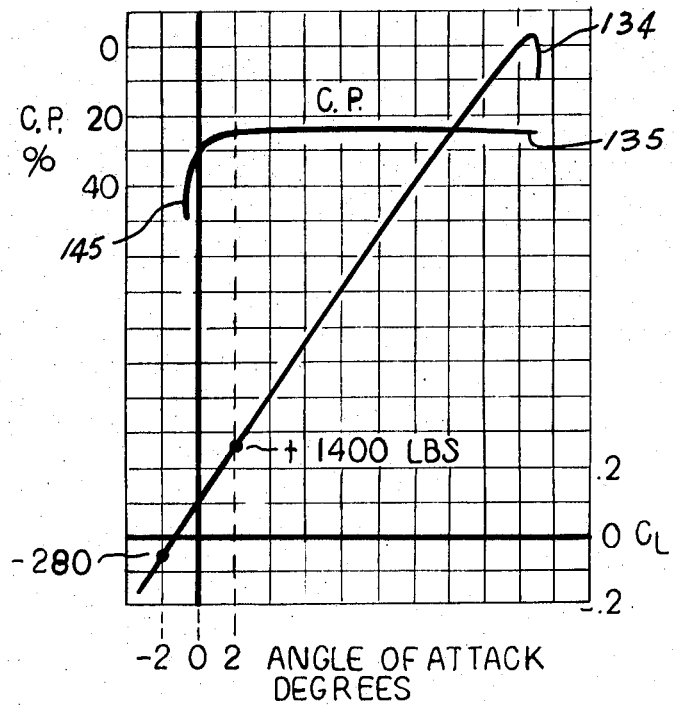
FIG. 8 is a graph showing the lift coefficient and center of pressure of the airfoil used in the floating wing configuration.
Figure 9:
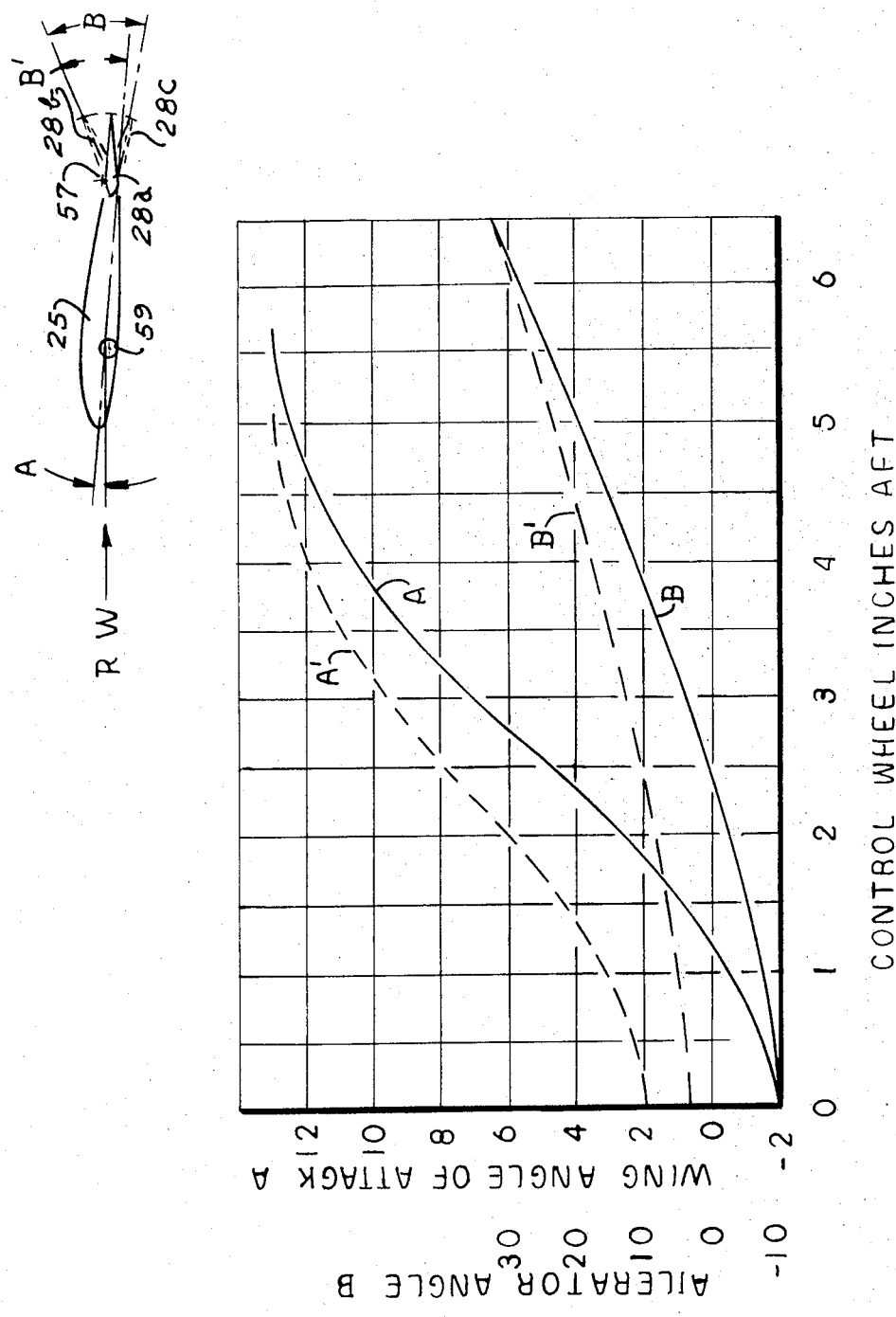
FIG. 9 is a graph showing the angle of attack of the wing with the ailerator position and control wheel position in the aircraft.

Although there are many possible configurations, the preferred configuration of my invention is shown in plan view of this application in FIG. 1 and further complemented by FIGS. 2, 3 and 4, where the wings 25 are supported on a lateral hinge support on line 72 for free rotation clockwise or counterclockwise in terms of angles of attack of the wing, more specifically illustrated in FIGS. 5, 8 and 9. A lateral structural support member 59 also shown in FIG. 5 hinges the wing structure outboard at 60 and passes internally in the wing across the fuselage 51 and connects to the opposite hand wing. The lateral structural support member 59 connects at the outboard points to the struts 22 and 53, also shown in FIGS. 2 and 3.

The wing structure is comprised of two basic structural members, a leading edge drag spar 62 in FIGS. 1 and 5 and a main wing bending spar 61 in the same FIGS. 1 and 5. To the spar 61 is attached the hinge fitting 60 which engages the wing 25 for free rocking clockwise or counterclockwise on the structural member 59 in FIG. 5.

As observed the main spanwise structural bending members 61 and 62 comprising the heaviest structure of the wing are forward of the hinge 59 and the hinge line 72. This weight distribution tends to balance the weight of the structure aft of the hinge 59. The structure on the aft side is very much lighter, but due to the large volume of the wing aft of the hinge line 72, a gravity balance on the hinge line 72 is ascertained by adding the counterweight 23 supported on a forward extending arm 24 from the wing 25 leading edge member 62. The arm 24 is structurally attached to the wing 25 at the wing spar member 62.

The structural hinge member 59 extending across the fuselage 51 is attached to the said fuselage by means not shown. Likewise the strut member 53 and 22 attach to the fuselage 51, FIGS. 1, 2 and 3, and form an apex to join to the structural wing hinge member 59 at the wing at about mid semi-span of the wing.

The wing further comprises rib members 54 intermittently spaced spanwise and attached to the spars 61 and 62. These ribs carry the wing loads into the spar members 61 and 62 which collect the wing loads and apply them to the wing hinge fitting 60 in FIG. 5.

The wing 25 further comprises a trailing edge aerodynamic surface 28 (ailerator) which is laterally hinged at 57 in FIG. 5 permitting the ailerator to travel on the said hinge 57 through an arc of approximately 42°. The surface 28 is actuated through the arc of 42°, positions 28a, b and c in FIG. 5, by means of a pilot's control linkage 58 and 63 and control cables 137 and 138. The cables 137 and 138 are anchored to the cable quadrant 55 which in turn is rotatably hinged at 56 to the wing structural member 54. The control cables 137 and 138 pass through the tubular hinge member 59 to the fuselage 51 and then forward to the pilot's control wheel 42 by means of the pulleys 139 in FIG. 3.

The said pilot's control wheel 42 when pulled forward and aft, arrows 140, moves the control surface (ailerator) 28 in FIG. 5 through the arc of 42°, positions 28a, b and c. Rotating the wheel 42 clockwise or counterclockwise moves the surfaces 28 on the left wing 25 differentially in direction to the surfaces 28 on the right wing 25. Pulling the wheel 42 fore and aft, arrows 140, causes the surfaces 28 in the left and right wings 25 to move up and down simultaneously through the positions 28a, b and c identically at the same time and in unison. Differential motion to the surfaces 28 on the left and right wings 25 is imparted when the pilot's wheel 42 is rotated clockwise or counterclockwise through the differential pulleys and gearing 141 associated with the wheel shaft 142. The cables 43 are anchored at the pulley and associated gearing 141.

The wing 25 in plan view is configured in a double taper beginning at mid semi-span and tapering in chord length and thickness both inboard toward the fuselage and outboard toward the wing tips. The surfaces 28 are placed at mid semi-span of the wing 25 to offer the maximum mechanical leverage to aerodynamically rotate the wing on its hinge member 59.

As is evident in FIG. 8 the airfoil characteristic used in the wing 25 has a center of pressure, C.P., of about 25 per cent which means that at 25 per cent the aerodynamic lift forward equals the aerodynamic lift aft. The wing although tapered as shown in FIGS. 1 and 4 has also a lateral C.P. line or mean aerodynamic center line (M.A.C.) of lift spanwise to the fuselage and aft of the hinge 59 and represented by the arrows LR in FIGS. 5, 6 and 7. The aft location of this M.A.C. and center of lift LR places a counterclockwise force on the wing 25 about the hinge 59.

Figure 6:
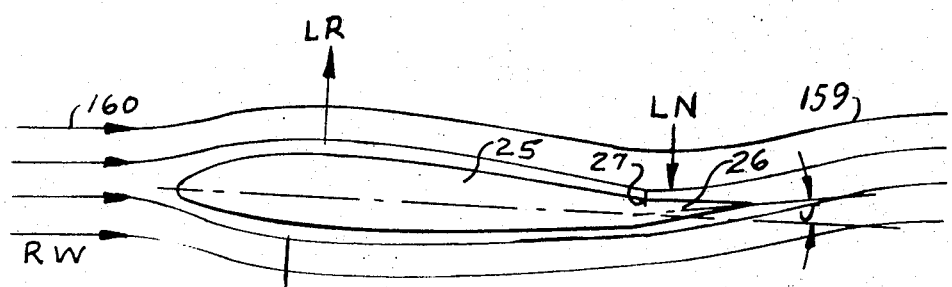
FIG. 6 is a section in enlarged scale through the wing on line 6—6 and propeller in FIGS. 1, 4 and 11 showing the integrally up-trimmed trailing edge of the wing's airfoil configuration.

The above said counterclockwise force LR about the hinge 59 is counteracted by a fixed trim force LN in FIG. 6 comprising the bent up trailing edge 26 angularly represented as J in said FIG. 6. The bent up trailing edge mold line at 27 in FIG. 6 is also seen as 27 in FIGS. 1 and 4. The aerodynamic forces LN generated by the bent up trailing edges 26 and 27 with the long moment arm about the hinge member 59 balance the oppositely and much larger wing lift forces LR with a relatively short moment arm with respect to the hinge member 59 in FIGS. 1, 4, 5 and 6. In FIG. 6 the downward arrow, WT., weight coincides with the hinge member 59 in FIG. 5. The weight represents the weight of the aircraft which the wing is supporting on the lateral hinge 59 upon which the wing aerodynamically floats, sensitive angularly to the mean direction of the relative wind and constantly adjusting to any change in direction of the relative wind.

Figure 7:
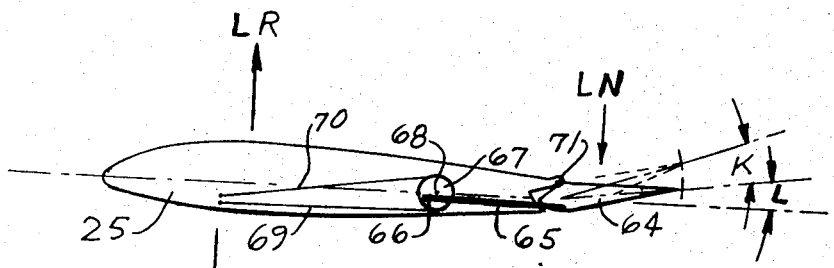
FIG. 7 is a section in enlarged scale taken on the line 7—7 in FIG. 4 showing the pilot's controllable aerodynamic trim surface supported on the trailing edge of the airfoil.

FIG. 7 discloses another alternate intermitten means of varying the trim force LN with a supplemental aerodynamic control surface with control means to the pilot to vary the angle of the surface 64 through the arc k. The surface 64 in FIG. 4 and FIG. 7 is hingedly secured to the wing 25 by the hinge means 71. A linkage 65 pins the surface 64 to the control quadrant 67 which is pinned to the wing structure for rotation of the quadrant at 68. The link 65 is pinned to the quadrant 67 at 66 at a position of arcuate travel so that the surface 64 can not be lowered below the position noted by the arc L, but permitting an upward travel indicated by the arc K. The cables 69 and 70 in FIG. 7 are anchored to the quadrant 67 and they are lead into the pilot's cabin through the structural hinge member 59 in FIGS. 1, 4 and 5 by means of the pulleys 143.

As in FIG. 6, in FIG. 7 the aerodynamic trim force LN with its large moment arm about the hinge 59 counter balances the large lift force LR with its small moment arm about the hinge 59 in FIG. 5 and indicated by the downward arrow WT. The force LN is adjustable by the pilot through the above described means to the cockpit and permits the pilot to vary the aerodynamic trim force LN to trim the airplane to fly hands-off at any desired angle of attack. These trim forces LN shown in FIGS. 6 and 7 balance the wing as disclosed in my U.S. Pat. No. 2,347,230, FIG. 4 and lines 35 through 61, page 6, rather than through the pilot's primary wheel control 42.

With the wing 25 balanced and aerodynamically trimmed as described above it is now possible to move the control surface 28 in FIG. 5 to the 28c or minus 10° position applying a force in the direction of the arrow 135. Moving the surface 28 by means of the pilot's wheel 42 to the position 28c, or minus 10° position, now produces a wing movement characteristic in FIG. 9 according to the solid curves A and B. It is noted that at the zero control wheel inches aft position the ailerator 28 is in the minus 10° position, 28c, and the wing 25 angle of attack is minus 2° permitting controlled flight downward at all times.

In referring this minus 2° angle of attack to FIG. 8 it will be seen that a negative lift of 280 pounds is produced allowing the aircraft to descend without requiring a reduction in aircraft speed, thereby restoring descent control to the aircraft at high speed which could not be accomplished as taught in my U.S. Pat. No. 2,347,230, FIG. 4.

The C.P. 145 of the airfoil as shown in FIG. 8 at minus 2° does not rapidly become unstable by a rapid aft C.P. travel as indicated because of the counteracting forces LN disclosed in FIGS. 6 and 7 of this application when the surfaces 28 are moved to the minus 10° position in FIGS. 5 and 9.

In FIG. 1 a light weight torsion bar 146 is anchored to the fuselage at 147 and to the wings 25 to return the wings 25 to a normally faired position when the airplane is static and on the ground. Under aerodynamic action the wings overcome this light torsion spring force to allow the floating wing to seek its desired angle of attack on the hinge member 59. The airfoil members 136 in FIG. 1 are fixedly secured to the fuselage 51 in FIGS. 1 and 2.

In FIG. 3 the inboard profile details including the pilot's controls are shown. Although a road drive comprising a chain drive 36, a transmission and clutch 35, a universal joint 48, a torque shaft 47 to the rear wheel 49 and gear box 148 are shown to indicate the unique and highly utilitarion application of my invention to a roadable airplane, these items are not necessarily an essential part of my invention.

The powerplant 33 is submerged in the fuselage 51 in FIG. 3. A flywheel counterweight and cooling fan 34 attaches to a clutch 39 which engages a universal 38. The universal 38 is connected to the drive shaft 37 which is also connected to the universal 49 and interconnected with the drive shaft 122 FIGS. 3 and 12.

The horizontal tail 52 is hingedly connected to the fuselage at 149 with a control means to the pilot, which is not shown, for elevation control of the fuselage tail in flight. The fins 29 are fixedly secured to the horizontal tail 52. And to the fins 29 are hingedly attached the rudders 50 with control wires 46 routed to the pilot's rudder peddles 45 in FIG. 3.

The steering wheel 42 rotation imparts a linear travel in the cables 44 which are routed to the wheels 21 which are hingedly secured to the front axle permitting the aircraft to be steered by the front wheels 21 through the steering wheel 42 in the pilot's cockpit.

In the fragmental plan view of FIG. 4 the alternate wing trim surface 64 is shown on the left wing. A similar surface 64 is also installed on the right wing which is not shown in the fragmented figure. The wing 25 is identical to the wing shown in plan view of FIG. 1 except for the addition of the auxiliary hinged trim surface 64 as shown in FIGS. 4 and 7. The up turned trailing edges 26 and 27 as shown in FIGS. 1, 4 and 6 are also present, which in FIG. 4 is identical to 26 in FIG. 6 except for its spanwise length which is reduced by the inclusion of the pilot's operable trim surface 64 in FIGS. 4 and 7.

For a dramatic and effective means of varying the descent angle without varying the flight speed of my aircraft this invention includes, but may be practiced without including, a tail pusher propeller which can convert the engine 33 torque power to forward thrust direction 89 or aft thrust direction 90 in FIGS. 3, 15 and 16 by means of changing the pitch angle of the blades at the command of the pilot as is shown in FIGS. 3, 11, 13, 15 and 16.

Location of the pusher propeller 30 on the tail and aft of the floating wing 25 makes the airplane safe for the novice to use reverse propeller 30 thrust in flight to vary the descent angle. Reverse propeller thrust is in common useage on fixed wing aircraft today but they are all tractor propellers mounted forward of the wing making application of reverse thrust in the air very dangerous because it interrupts the airflow over the wings and destroys the lift of the wings. Therefore, most airplanes with reverse propeller thrust capability use the reverse thrust only after the wheels have touched the ground on landing to reduce the landing run of the aircraft. In my aircraft the propeller 30 is mounted aft of the wing 25 and aft of the tail surfaces 29, 50, and 52, thereby, permitting the reverse propeller thrust to be used in flight to steepen gliding descent because the disturbed airflow from the propeller does not pass over any of the wing lifting surface or tail control surfaces.

Figure 18:
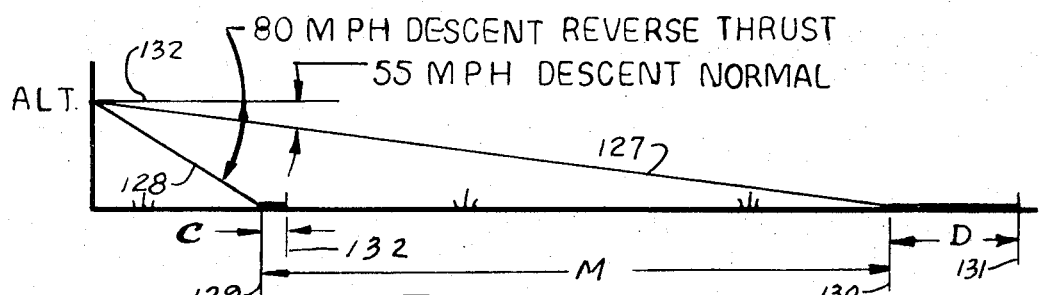
FIG. 18 is a graph showing the wide choice of landing area between normal glide-angle and maximum propeller braking with reverse propeller thrust.
Figure 17:
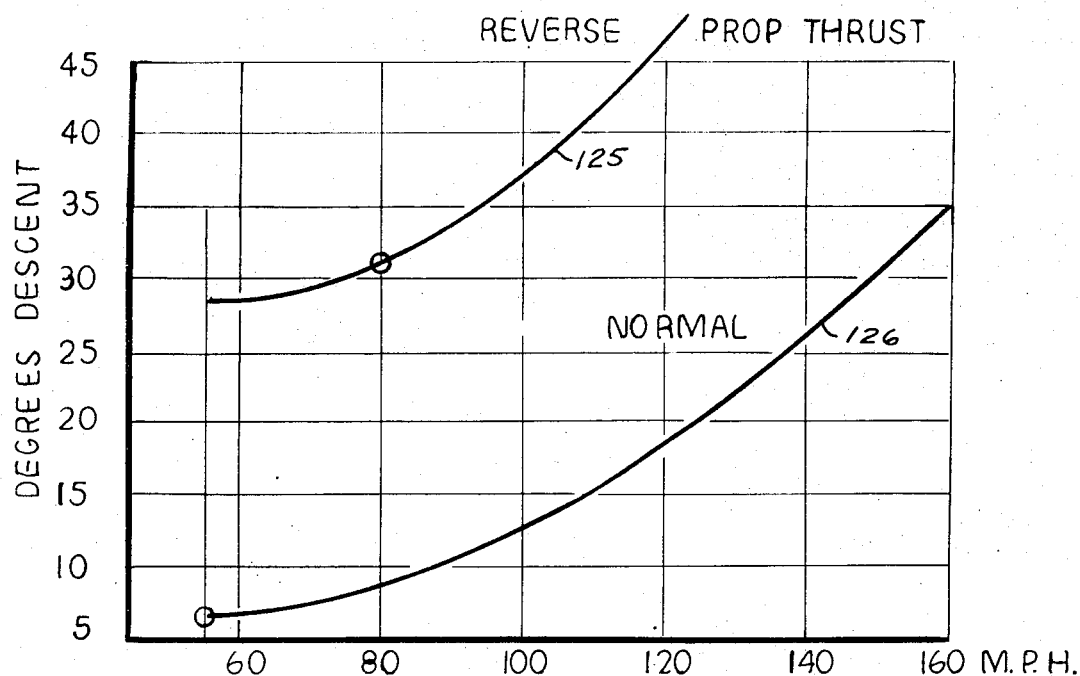
FIG. 17 is a graph showing the normal glide of the aircraft without propeller braking and glide descent with reverse thrust propeller braking.

In addition it is shown in FIG. 18 that the normal poweroff glide angle line 127 of an aircraft would have a shallow angle of descent and a lengthy landing run D without propeller 30 reverse thrust means. In FIG. 17 it is shown that the normal glide speed for an aircraft without aerodynamic braking from reverse thrust increases as the angle of descent increases as indicated by the curve 126. Therefore, to get into a landing area when the pilot overshoots, to increase the descent angle increases the descent speed and creates a hazard in stopping the vehicle on the ground due to the excessive speed. On the curve 126 a descent angle of 35° will produce a flight speed of 160 miles per hour (MPH).

With reverse propeller 30 thrust 90 in FIG. 3, and as illustrated in FIGS. 17 and 18, the descent angles can be increased dramatically as indicated by curve 125. In FIG. 18 a descent speed of 80 MPH, miles per hour, is shown by the line 128 and the short run out distance C on the ground in Comparison to line 127 without propeller reverse thrust.

In FIGS. 17 and 18 it is shown that with propeller reverse thrust and at the command of the pilot the aircraft may descent at 55 MPH, curve 126, on a descent path of 7°. The pilot may elect to steepen his descent angle to 28° using reverse thrust on curve 125 while still maintaining 55 MPH descent speed. This greatly increases the capability and safety of this aircraft in the hands of a novice.

As is shown in FIG. 18, as the descent angle changes, lines 127 and 128, the angle of attack of a fixed wing aircraft will rapidly increase and dangerously approach the stall angle of the fixed wing aircraft. The floating wing 25 of my aircraft will automatically adjust its float attitude to the proper angle of attack as the descent angle varys, thereby, greatly increasing the safety of this aircraft with reverse propeller thrust 90 in combination with a floating wing 25 and with the pusher propeller 30 located aft of the tail.

Reverse propeller thrust 90 may be accomplished by a number of mechanical schemes in the design of a propeller. While in FIG. 11 I have chosen the unique means similar to what I have employed in my U.S. Pat. No. 3,166,271 FIGS. 8, 9 and 10, my invention anticipates other mechanical design schemes to accomplish reverse propeller thrust.

Figure 12:
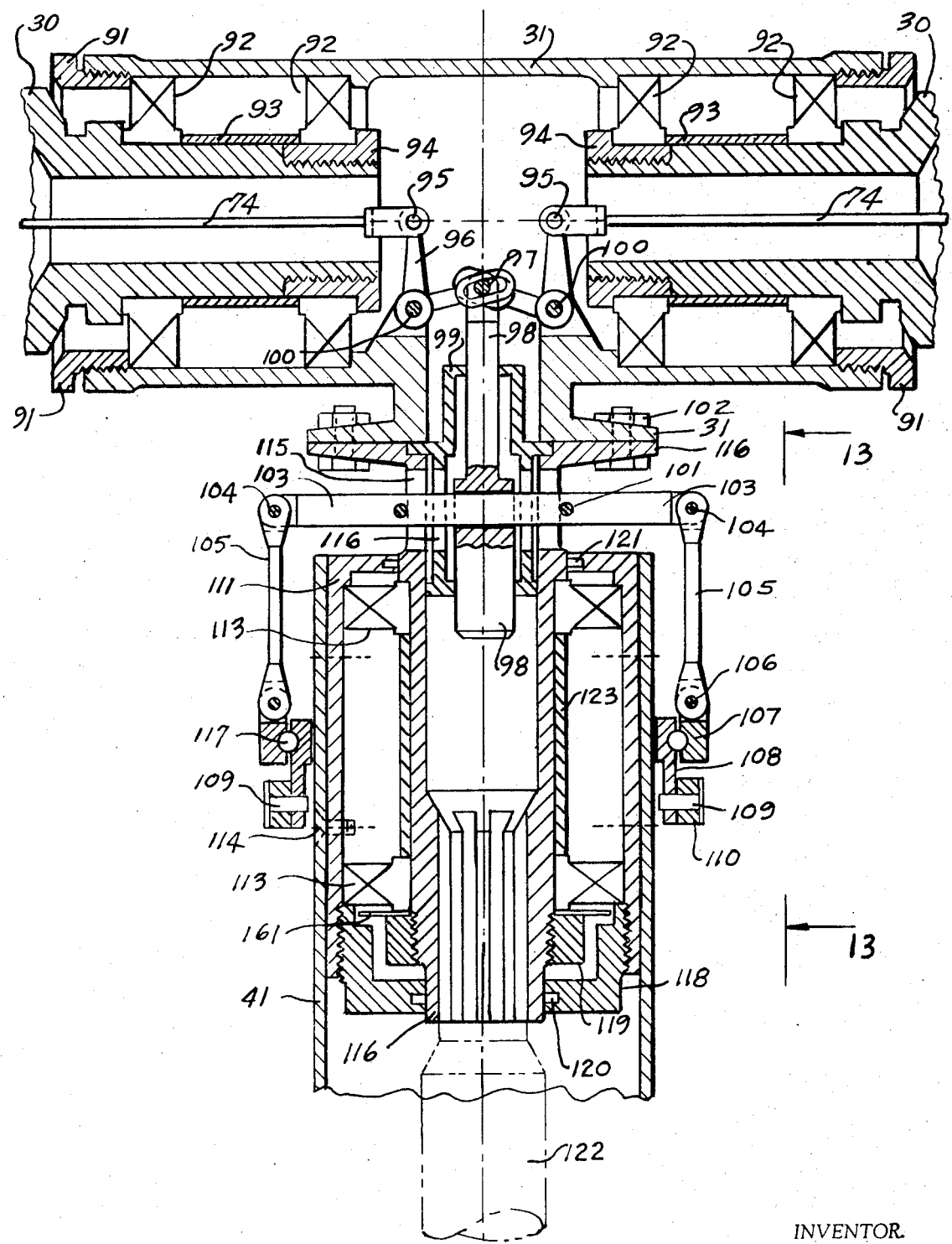
FIG. 12 is a section in enlarged scale taken on the line 12—12.

In FIG. 11 of this application the propeller airfoil blades are freely attached to the hub 31 for rotation in pitch as shown in FIGS. 12 and 14. The blade airfoils 30 have auxiliary aerodynamic control surfaces 73 hingedly secured to the blades at the hinge axis 151. The surfaces 73 are pilot controlled through the cable means 80 and 81 which are anchored to cable quadrants on the surfaces 73, and the said cables pass over the pulleys 76 and 77 and anchor to the quadrant 75.

The push rods 74 in FIGS. 11 and 12 are pin connected at the outer ends to quadrants 75 and at the inner ends to bellcranks 96 at the pins 95. The bellcranks 96 are pin connected to the propeller hub 31 by the push rod 98. A slot in the bellcranks at pin 97 permits the push rod 98 to impart a linear motion to rods 74 in a lateral plane while the rod 98 is actuated in the vertical axis of the propeller hub.

The push rod 98 is guided in the axis of the hub by means of the sleeve 99. The push rod 98 has a center hole which engages the cylinderical actuating rod 103 which extends through a slot 115 in the propeller shaft 116 and in the sleeve 99. The slot 115 permits the actuating rod to raise and lower vertically in FIG. 12, thereby imparting a vertical motion to the push rod 98. The rod 103 is centered on the propeller hub axis by the pins 101 extending through and overhanging the rod 103, thereby, engaging the propeller shaft 116 allowing the rod to slide vertically in the slot 115 while remaining centered vertically.

The rod 103 is pinned at each end by means of pins 104 to the links 105. The links 105 are in turn pinned to the annular outer ball bearing retainer ring 107 shown in FIGS. 12 and 13. The said retainer ring and links 105 rotate with the propeller shaft 116.

An inner ball bearing retainer ring 108 retains the balls 117 along with the outer ring 107 and is pinned at 109 to the rockable yoke 110 in FIG. 13. The said yoke 110 is pinned to the propeller shaft housing 41 at 124 by means of the pin 125. The fitting 124 is fixedly secured to the propeller housing 41. The inner bearing ring 108 does not rotate with the propeller shaft 116.

A push pull link 154 which leads to the pilot's cockpit is pinned at 156 in FIG. 13 to rock the yoke 110 about the pin 155 as indicated by the arrows 129 and 128. This motion ultimately translates through the links 105, rods 74 to the surfaces 73 in FIGS. 11, 12 and 13.

The propeller blades 30 in FIG. 11 comprise an airfoil similar in characteristics to the wing 25 shown in FIG. 8. The blades 30 are similarily balanced statically, dynamically and aerodynamically on the axis coincident with the center line of rods 74 in FIGS. 11 and 12. The blades 30 freely float on the bearings 92 in the hub 31. The blades 30 are retained in the hub by means of the thrust nut 94 which bears against the bearings 92 which through spacer 93 cause the bearings to thrust against the nuts 91 which retain the propeller hub assembly into the hub 31.

In FIG. 11 the blades 30 are balanced about the blade pitching axis 152 by means of the leading edge counterweight 78. The airfoil lift or thrust equivalent to LR in FIG. 5 is aft of the blade's pitching axis 152. A bent up trailing edge 26 on the bend line 27 as shown in FIG. 6 provides an aerodynamic balancing force LN in FIGS. 11 and 6. The pilot controlled aerodynamic surfaces 73 shown in FIGS. 11 and 14 provide aerodynamic forces to drive the propeller blade 30 pitch angle for forward thrust with the surface in 73a and arcuate travel H; and to drive the blade 30 pitch angle to reverse propeller thrust, the surface 73 moves to 73b through the arcuate travel G of the surfaces 73, FIG. 14.

The resolution of airflow and blade 30 angles of attack are shown in FIGS. 15 and 16. In FIG. 15 the forward thrust 89 is derived from the inflow air 83 in combination with the propeller RPM 82. This produces a relative wind direction of 84. An angle of attack F is imposed on the relative wind direction 84 by the blade 30 to produce the thrust 89 in FIGS. 3 and 15.

In FIGS. 16 and 14 the reverse thrust resolution of airflow is shown. The airfoil blades 30 are at a negative angle E to the relative wind 86 and produce a reverse thrust 90. The arrows 153 in FIGS. 15 and 16 represent the direction of the flight of the aircraft.

In FIGS. 12 and 13 the hub assembly 31 is fixedly secured to the propeller drive shaft 116 by means of the bolts and nuts 102. The propeller shaft 116 is supported in the propeller support housing 41 FIGS. 3 and 12 by means of the housing 111 secured by the screws 114. The housing 111 supports the propeller shaft 116 for rotation by means of the bearings 113 which are retained in the housing 111 by means of the spacer sleeve 123 and thrust nut 119 and 118. An oil slinger 161 and oil seals 120 and 121 retain the oil within the housing 111. The propeller shaft 116 is splined to key the mating propeller shaft 122, shown in phantom lines, in FIG. 12 to the said shaft 116.

In FIGS. 3, 12 and 13 the reverse propeller control arm 110 is connected to a push-pull cable 154 which leads to the pilots cockpit i FIG. 3 and is actuated in the direction of the arrows 160 by the pilot by the means of the knob 164.

In FIG. 3 another control knob 165 in the pilots cockpit is shown which through push rod 166 actuates quadrant 168 and cables 167, which continue through the hinge 59 on axis 72 in FIG. 4 and connect to cables 70 and push rod 65 in FIGS. 4 and 7. Suitably anchored in the wing are pulleys 143 to guide the cables 69 and 70 into the hinge member 59 to engage pulleys 170 in FIG. 4.

The cables 43 in FIGS. 3 and 4 are guided into the hinge member 59 and engage pulleys 144 to actuate control surfaces 28 through cables 137 and push rod 58 in FIG. 5.

Note in FIG. 3 that the airplane C.G. is slightly forward of the wing WT. pivot point at the apex of the struts 21 and 53. The fuselage C.G. is counterbalanced by the horizontal tail 52 by means of a downward aerodynamic force.

Figure 19:
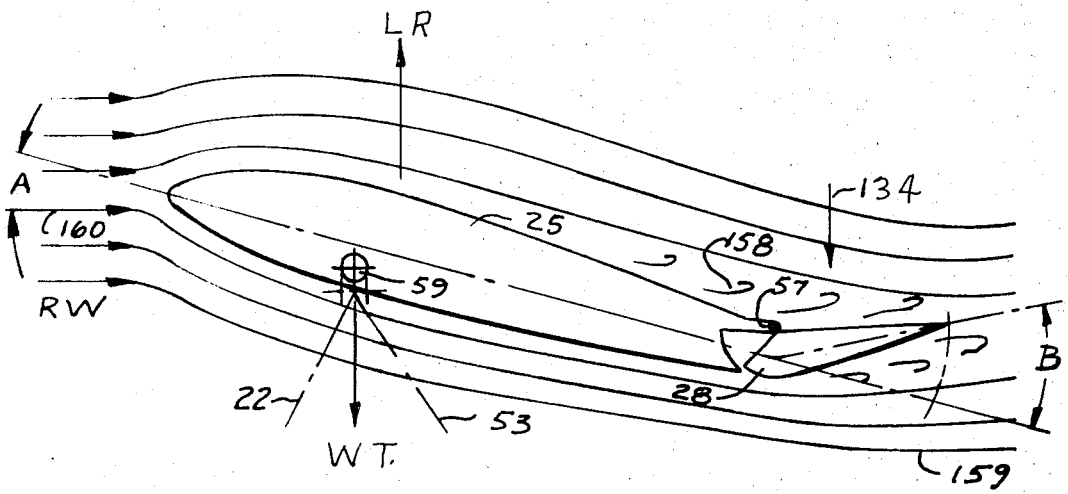
FIG. 19 is a schematic airflow showing the aerodynamic forces prevailing which make the floating wing impossible to aerodynamically stall.

In FIG. 19 is shown the aerodynamic action of the wing 25 above 12 degrees angle of attack FIG. 9. As the angle of attack increases the airflow 159 on the top of the wing begins to break away from the surface as indicated by the turbulent currents 158 on the top side of the control surface 28. The magnitude of the aerodynamic force 134 is reduced and consequently the lift force LR places a counterclockwise force about the hinge member 59 and reduces the wing's 25 angle of attack.

The control member 28 also further tends to lose its aerodynamic force 134 by means of the turbulent flow 158 on the bottom side of the surface 28 as seen in FIG. 19. As the angle of surface 28 is increased it also tends to aerodynamically stall, further making the floating wing 25 stall proof and a safe airplane for use by the novice.

In the flight of my airplane the pilot will set the trim control knob 165, FIG. 3, for the desired hands-off trim position for the desired flight, takeoff, landing, climb, or cruise. By means of the wheel 42 fore and aft movement the airplane will climb or descend. For steep descents at slow speed the pilot will use the control 164 to reverse the propeller 30. This control may be used in flight by the novice without fear of stalling the aircraft as the floating wing 25 on its hinge 59 floats into the relative wind 160 and adjusts continually to any momentary or countinous variation of the relative wind direction.

Therefore, although I have herein shown and described my invention in what I have conceived to be the most practical and preferred embodiment it is recognized that extensive departures may be made therefrom within the scope of my invention, which is not limited to the details disclosed herein, but is accorded the full scope of the claims so as to embrace any and all equivalent structures.

Having described my invention what I claim as new and desire to secure by letters Patent is:

1. An aircraft having a principle lifting wing with a leading edge, a trailing edge, a wing chord plane and a spanwise length the said wing being located substantially at the center of gravity of the aircraft comprising a lateral supporting hinge means on the spanwise length of the wing attaching the wing to the aircraft for freely rocking the wing in pitch in response to the airflow and aerodynamic forces on the wing, the wing having a chordwise mean aerodynamic center of lift with the said lateral hinge means located forward of the said center of lift, static balance means forward of the lateral hinge means supporting the wing to statically balance the wing on the lateral hinge means, at the trailing edge of the wing an upturned aerodynamic surface means fixedly secured to the wing to produce a downward aerodynamic force in an opposite direction to the upward center of lift of the wing, on the trailing edge of the wing a pilot-controlled aerodynamic surface means with a lateral hinge means associated with the wing hingedly securing the said control surface to the wing for rocking of the said surface upward and downward to generate downward and upward aerodynamic forces respectively, control means connecting to the pilot-controlled aerodynamic surface and to the pilot's cockpit controls with respect to the wing at the command of the pilot to provide the primary control means to the wing in response to aerodynamic action of the surface to vary the pitch angle of the principle lifting wing on said wing's lateral hinge, thereby permitting the principle wing to freely respond angularly in pitch to the airflow direction and to the pilot-controlled aerodynamic forces in flight.

2. An aircraft wing as in claim 1 having an auxiliary aerodynamic trim surface laterally secured with hinge means to the principle lifting wing at the trailing edge, associated hinge means on the wing to hingedly secure the trim surface to the wing, adjustment control means to vary or preset a variable amount of aerodynamic trim force in a downward clockwise direction in opposition to the upward lifting force at the center of lift of the principle lifting wing.

3. An airplane with the principle lifting wing having a leading edge, a trailing edge, a wing chord plane and a span-wise length, the said wing being located substantially at the center of gravity of the aircraft comprising a lateral supporting hinge means on the spanwise length of the wing attaching the wing to the aircraft for freely rocking the wing in pitch in response to the airflow and aerodynamic forces on the wing, the wing having a chordwise mean aerodynamic upward center of lift with the said lateral hinge means located forward of the said center of lift, static balance means forward of the lateral hinge means supporting the wing to statically balance the wing on the said lateral hinge means, an aerodynamic trim surface hingedly secured with hinge means to the trailing edge of the wing and associated hinge means on the wing, adjustment control means to vary or preset a variable amount of aerodynamic trim force in a downward clockwise direction in opposition to the upward lifting clockwise force at the center of lift of the wing, on the trailing edge of the wing exclusive of said trim surface a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface and to the cockpit controls at the command of the pilot to provide the primary control means in response to airflow to vary the pitch angle of the wing on the said wing's lateral hinge, thereby permitting the wing to respond in pitch attitude to the airflow direction and to the pilot-controlled aerodynamic forces in flight.

4. An aircraft comprising a wing, a fuselage, the wing supported substantially at the center of gravity of the aircraft, a horizontal tail surface, a vertical tail surface, a pusher propeller supported aft of the tail surfaces supported for rotation to provide forward thrust for normal flight, powerplant means to rotate said propeller, the propeller having blade means adjustable in pitch to vary the thrust and to rotate the blades to the reverse thrust position, controllable means to the blades and to the pilot to reverse the thrust to steepen the descent angle in flight for landing.

5. An aircraft comprising a freely floating wing with lateral hinge means for response of the wing to the airflow direction and pilot's control, the wing supported substantially at the center of gravity of the aircraft, a horizontal tail surface, a vertical tail surface, a propeller and engine means to rotate the propeller for forward thrust, the propeller having blade means adjustable in pitch to vary the thrust and to rotate the blades to reverse thrust position, controllable means to the blades and to the pilot to reverse the thrust to steepen the descent angle in flight for landing.

6. An aircraft as in claim 5 having the said propeller located aft of the tail surfaces providing pusher thrust and reverse thrust at the command of the pilot.

7. A monoplane comprising a fuselage, a vertical and horizontal tail, a wing assembly comprising right and left wings, each wing comprising a cambered airfoil with a leading edge, a trailing edge, a wing chord plane and a spanwise length, the said wing being attached substantially at the center of gravity of the aircraft comprising a lateral supporting hinge on a spanwise axis of the wing attaching the wing to the aircraft fuselage for freely rocking the wing in pitch attitude in response to the direction of the airflow and aerodynamic forces on the wing, the wing having a mean upward aerodynamic center of lift normal to the chord plane with the lateral hinge means of the wing located forward of the said mean aerodynamic center of lift, static balance means forward of the lateral hinge means supporting the wing to statically balance the wing on the said lateral hinge means, an aerodynamic trim surface hingedly secured with hinge means laterally to the trailing edge of the wing and associated hinge means on the wing, adjustment control means to vary or preset a variable amount of aerodynamic trim force in a downward clockwise direction on the trailing edge in opposition to the upward lifting counter clockwise force at the center of lift of the wing, on the trailing edge of the wing exclusive of the said aerodynamic trim surface a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface means and to the pilot's cockpit controls and at the command of the pilot to provide the primary control means in response to the airflow to vary the pitch angle of the wing on the said wing's lateral hinge, thereby permitting the wing to respond in pitch attitude to the airflow direction and to the pilot-controlled aerodynamic forces in flight.

8. A monoplane comprising a fuselage, a vertical and horizontal tail, a cambered wing assembly comprising right and left wings, each wing comprising a cambered airfoil with a leading edge, a trailing edge, a wing chord plane and a spanwise length, the said wing being attached substantially at the center of gravity of the aircraft comprising a lateral supporting hinge on a spanwise axis of the wing attaching the wing to the aircraft fuselage for freely rocking the wing in pitch attitude in response to the direction of the airflow and aerodynamic forces on the wing, the wing having a mean upward aerodynamic center of lift normal to the chord plane with the lateral hinge means of the wing located forward of the said mean aerodynamic center of lift, static balance means forward of the lateral hinge means supporting the wing to statically balance the wing on the said lateral hinge means, at the trailing edge of the wing an upturned aerodynamic surface means fixedly secured to the wing to produce a downward aerodynamic force in an opposite direction to the upward center of lift of the wing, on the trailing edge of the wing a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface means and to the pilot's cockpit controls and at the command of the pilot to provide the primary control means in response to the airflow to vary the pitch angle of the wing on the said wing's lateral hinge, thereby permitting the wing to respond in pitch attitude to the airflow direction and to the pilot-controlled aerodynamic forces in flight.

9. An aircraft as in claim 8, a wing having an auxiliary aerodynamic trim surface laterally secured with hinge means to the principle lifting wing at the trailing edge, exclusive of the pilot-controlled aerodynamic surface means associated hinge means on the wing to hingedly secure the trim surface to the wing, adjustment control means to vary or preset a variable amount of aerodynamic trim force in a downward clockwise direction in opposition to the upward lifting force at the mean aerodynamic center of lift of the principle lifting wing.

10. An airplane comprising a fuselage, a horizontal tail, a vertical tail, cambered wings mounted on the fuselage for free rotation on a lateral axis slightly forward of the center of lifting pressure and devoid of direct pilot control, flight control members hingedly mounted in the wings within the cross sectional form of the same and comprising a part of said cross sectional form, and manually controlled means to selectively move both said flight control members either in the same or relatively opposite angular directions to vary the negative or positive lift of the members and thus alter the angle of attack of the respective wings, at the trailing edge of the wings, exclusive of the flight control members upturned aerodynamic surface means secured to the wings to generate a negative lift to balance the positive lifting pressure of the wings to maintain the said wings in aerodynamic trim balance.

11. An airplane comprising a fuselage, sustaining cambered airfoils on the fuselage for free rotation on axes lying substantially in a vertical plane passing through the center of gravity of the airplane in normal flight and forwardly of the center of lifting pressure of said airfoils, said airfoils having no direct pilot-manual or pilot-mechanical connections for guiding, limiting the movement, or turning the airfoils on their said axes, aerodynamic control surfaces hingedly supported on said airfoils aft of the center of lifting pressure of the said airfoils, pilot controlled linkages to the aerodynamic control surface to rotate the said control surfaces commonly or selectively up and down to vary the positive or negative lift forces on the said airfoils thereby to vary the angle of attack of the said airfoils, exclusive of the said aerodynamic control surfaces aerodynamic trim surface means hingedly secured with hinge means laterally at the trailing edge of the sustaining airfoils and associated hinge means to vary or preset a variable amount of aerodynamic trim force to balance the aerodynamic lifting force of the said sustaining airfoils.

12. An airplane comprising a fuselage, a horizontal tail, a vertical tail, cambered wings on the fuselage for free rotation on a lateral axis slightly forward of the center of lifting pressure and devoid of direct pilot control flight control members hingedly mounted in the wings within the cross sectional form of the said wings, manually controlled means to selectively move both flight control members either in the same or relatively opposite angular directions to vary the negative or positive lift of the members and thus alter the angle of attack of the respective wings, at the trailing edge of the wings upturned aerodynamic surface means secured to the wings to generate a negative lift to balance the positive lifting pressure of the wings to maintain the said wings in aerodynamic trim and balance, a pusher propeller supported aft of the tail surfaces supported for rotation to provide forward thrust for normal flight, powerplant means to rotate said propeller, the propeller having a hub and blade means adjustable in pitch to vary the thrust and to rotate the blades to the reverse thrust position, controllable means to the blades and to the pilot to reverse the thrust to steepen the descent angle in flight for landing, the propeller blades comprising a cambered air foil, a blade attachment means for free rotation in the hub on an axis slightly forward of the center of lift of the airfoil, static balance weights on the airfoil leading edge to statically balance the blades on the blade airfoil rotation axis, aerodynamic control surface means hingedly secured to the trailing edge of the airfoil to rotate the blade to positive or negative thrust position in response to the aerodynamic action of the control surface, at the trailing edge of the blade airfoil an upturned aerodynamic surface means secured to the blade airfoil to generate a negative lift to balance the positive lifting pressure of the main blade airfoil thereby permitting the aerodynamic control of the blade in positive and negative thrust positions.

13. A monoplane comprising a fuselage, a vertical and horizontal tail, a wing assembly comprising right and left wings, each wing comprising a cambered airfoil with a leading edge, a trailing edge, a wing chord plane and a spanwise length, the said wing being attached substantially at the center of gravity of the aircraft comprising a lateral supporting hinge on a spanwise axis of the wing attaching the wing to the aircraft fuselage for freely rocking the wing in pitch attitude in response to the direction of the airflow and aerodynamic forces on the wing, the wing having a mean upward aerodynamic center of lift normal to the chord plane with the lateral hinge means of the wing located forward of the said mean aerodynamic center of lift, static balance means forward of the lateral hinge means supporting the wing to statically balance the wing on the said lateral hinge means, an aerodynamic trim surface hingedly secured with hinge means laterally to the trailing edge of the wing and associated hinge means on the wing, adjustment control means to vary or preset a variable amount of aerodynamic trim force in a downward clockwise direction on the trailing edge in opposition to the upward lifting counter clockwise force at the center of lift of the wing, on the trailing edge of the wing a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface means and to the pilot's cockpit controls and at the command of the pilot to provide the primary control means in response to the airflow to vary the pitch angle of the wing on the said wing's lateral hinge, thereby permitting the wing to respond in pitch attitude to the airflow direction and to the pilot-controlled aerodynamic forces in flight, a pusher propeller means supported aft of the tail surfaces supported for rotation to provide forward thrust for normal flight, powerplant means to rotate said propeller means, the propeller comprising propeller blades adjustable in pitch angle to vary the thrust and to rotate the blade pitch angle to the reverse thrust position, controllable means to the blades and to the pklot to reverse the thrust to steepen the descent angle of the aircraft in flight.

14. A monoplane comprising a fuselage, a vertical and horizontal tail, a cambered wing assembly comprising right and left wings, each wing comprising a cambered airfoil with a leading edge, a trailing edge, a wing chord plane and a spanwise length, the said wing being attached substantially at the center of gravity of the aircraft comprising a lateral supporting hinge on a spanwise axis of the wing attaching the wing to the aircraft fuselage for freely rocking the wing in pitch attitude in response to the direction of the airflow and aerodynamic forces on the wing, the wing having a mean upward aerodynamic center of lift normal to the chord plane with the lateral hinge means of the wing located forward of the said mean aerodynamic center of lift, static balance means forward of the lateral hinge means supporting the wing to statically balance the wing on the said lateral hinge means, at the trailing edge of the wing an upturned aerodynamic surface means fixedly secured to the wing to produce a downward aerodynamic force in an opposite direction to the upward center of lift of the wing, on the trailing edge of the wing a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface means and to the pilot's cockpit controls and at the command of the pilot to provide the primary control means in response to the airflow to vary the pitch angle of the wing on the said wing's lateral hinge, thereby permitting the wing to respond in pitch attitude to the airflow direction and to the pilot-controlled aerodynamic forces in flight, a pusher propeller means supported aft of the tail surfaces supported for rotation to provide forward thrust for normal flight, powerplant means to rotate the said propeller means for thrust, the propeller comprising propeller blades adjustable in pitch angle to vary the thrust and to rotate the blade pitch angle to the reverse thrust position, controllable means to the blades and to the pilot to reverse the thrust to steepen the descent angle of the aircraft in flight.

15. A monoplane comprising a fuselage, a vertical and horizontal tail, a cambered wing assembly comprising right and left wings, each wing comprising a cambered airfoil with a leading edge, a trailing edge, a wing chord plane and a spanwise length, the said wing being attached substantially at the center of gravity of the aircraft comprising a lateral supporting hinge on a spanwise axis of the wing attaching the wing to the aircraft fuselage for freely rocking the wing in pitch attitude in response to the direction of the airflow and aerodynamic forces on the wing, the wing having a mean upward aerodynamic center of lift normal to the chord plane with the lateral hinge means of the wing located forward of the said mean aerodynamic center of lift, static balance means forward of the lateral hinge means supporting the wing to statically balance the wing on the said lateral hinge means, at the trailing edge of the wing an upturned aerodynamic surface means fixedly secured to the wing to produce a downward aerodynamic force in an opposite direction to the upward center of lift of the wing, on the trailing edge of the wing a primary pilot-controlled aerodynamic surface means with a lateral hinge means associated with the wing hingedly securing the said control surface to the wing for rocking the said surface upward and downward with respect to the wing to generate downward and upward aerodynamic forces respectively, control means connecting to the pilot-controlled aerodynamic surface means and to the pilot's cockpit controls which at the command of the pilot to provide a primary control means in response to the airflow to vary the pitch angle of the wing on the said wing's lateral hinge, thereby permitting the wing to respond in pitch attitude to the airflow direction and to the pilot-controlled aerodynamic forces in flight, an auxiliary aerodynamic trim surface laterally secured with hinge means to the principle lifting wing at the trailing edge exclusive of the pilot-controlled aerodynamic surface means, associated hinge means on the wing to hingedly secure the trim surface to the wing, adjustment control means to vary or preset a variable amount of aerodynamic trim force in a downward clockwise direction in opposition to the upward lifting force at the mean aerodynamic center of lift of the principle lifting wing, a pusher propeller means supported aft of the tail surfaces supported for rotation to provide forward thrust for normal flight, powerplant means to rotate the said propeller means for thrust, the propeller comprising blades adjustable in pitch angle to vary the thrust and to rotate the blade pitch angle to the reverse thrust position, controllable means to the blades and to the pilot to reverse the thrust to steepen the descent angle of the aircraft in flight.

* * * * *